(12) United States Patent
Jia

(10) Patent No.: US 10,244,286 B1
(45) Date of Patent: Mar. 26, 2019

(54) RECOMMENDING DIGITAL CONTENT OBJECTS IN A NETWORK ENVIRONMENT

(71) Applicant: FMR LLC, Boston, MA (US)

(72) Inventor: Yugang Jia, Winchester, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 15/884,134

(22) Filed: Jan. 30, 2018

(51) Int. Cl.
*G06F 3/00* (2006.01)
*G06F 13/00* (2006.01)
*H04N 5/445* (2011.01)
*H04N 21/466* (2011.01)
*H04N 21/441* (2011.01)
*H04N 21/442* (2011.01)

(52) U.S. Cl.
CPC ....... *H04N 21/4668* (2013.01); *H04N 21/441* (2013.01); *H04N 21/44222* (2013.01); *H04N 21/4665* (2013.01); *H04N 21/4666* (2013.01)

(58) Field of Classification Search
CPC .............. H04N 21/4668; H04N 21/441; H04N 21/44222; H04N 21/4665; H04N 21/4666
USPC ..................................... 725/46, 9, 10, 34, 47
See application file for complete search history.

(56) References Cited

U.S. PATENT DOCUMENTS

| 8,983,888 | B2 | 3/2015 | Nice et al. | |
| 9,691,035 | B1 | 6/2017 | Sandler | |
| 2009/0299996 | A1 | 12/2009 | Yu et al. | |
| 2012/0023045 | A1* | 1/2012 | Steck | G06N 99/005 706/12 |
| 2016/0014461 | A1* | 1/2016 | Leech | H04N 21/4668 725/14 |
| 2016/0078520 | A1 | 3/2016 | Nice et al. | |
| 2017/0024391 | A1 | 1/2017 | Steck | |
| 2017/0148085 | A1 | 5/2017 | Tang et al. | |
| 2017/0161639 | A1 | 6/2017 | Zeng et al. | |
| 2017/0251258 | A1* | 8/2017 | Swaminathan | H04N 21/4668 |

* cited by examiner

*Primary Examiner* — Nnenna N Ekpo
(74) *Attorney, Agent, or Firm* — Proskauer Rose LLP

(57) ABSTRACT

Methods and apparatuses are described for recommending digital content in a network environment. A web server determines a session context of a user associated with a remote device in which the user interacted with digital content objects. The web server identifies prior content interactions in which prior users interacted with digital content objects. The web server builds a recommendation feature vector from the session context and the prior content interactions. The web server trains a machine learning model using the generated recommendation feature vector to minimize a predicted rating. The web server selects target digital content objects that have a predicted rating of the user that is at a threshold. The web server provides indicia of the selected digital content objects to the remote device. The web server causes at least one of the selected target digital content objects to be transmitted from a content server to the remote device.

20 Claims, 8 Drawing Sheets

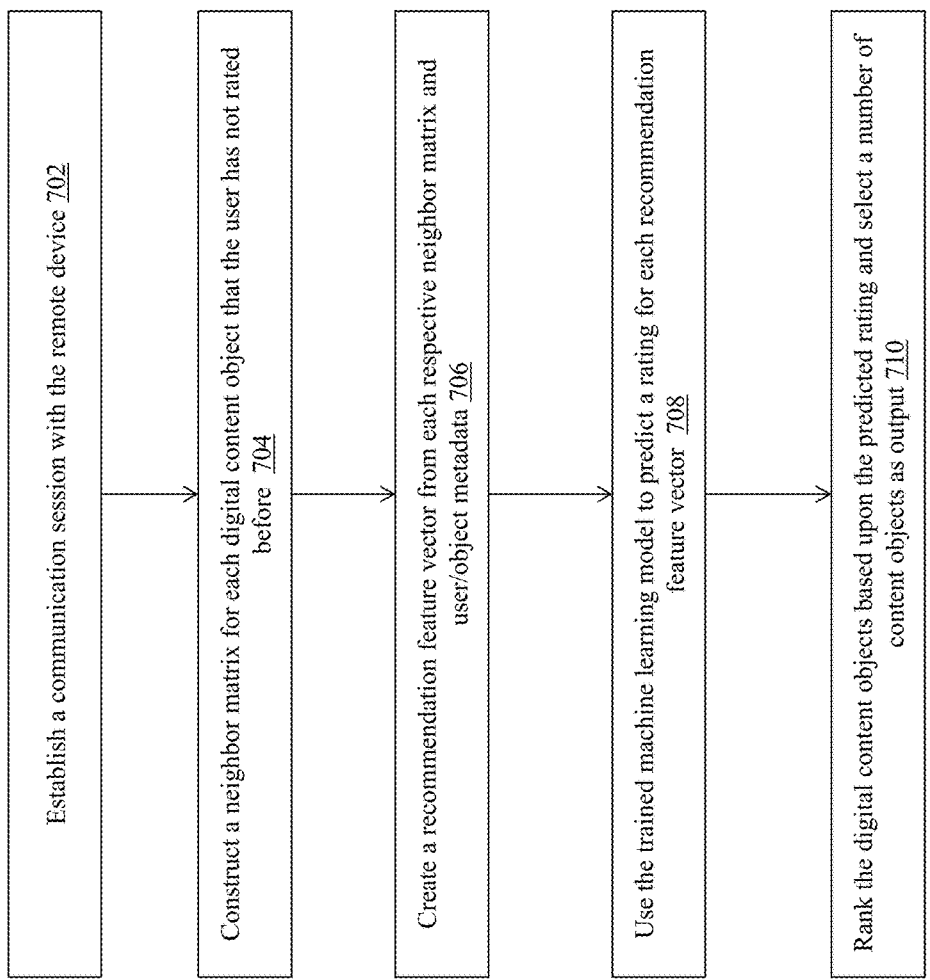

RECOMMENDING DIGITAL CONTENT OBJECTS IN A NETWORK ENVIRONMENT

TECHNICAL FIELD

This application relates generally to methods and apparatuses, including computer program products, for recommending digital content objects in a network environment.

BACKGROUND

As computing devices such as smartphones, smart televisions, and tablets have become the preferred way for many consumers to interact with digital content like movies and music, content providers have become interested in generating content recommendations that are tailored to each particular user's interests and preferences. A traditional way of generating such recommendations are through the use of recommender systems, that analyze user behavior to identify similarities between users and/or content in order to select content that is likely to be of interest to certain users.

Such recommender systems typically rely on techniques like matrix factorization, in which content objects and users are each characterized into vectors based upon content ratings, and then similarity between vectors is calculated. High similarity suggests a content item that is more likely to be of interest to a user. An exemplary matrix factorization technique is described in Koren et al., "Matrix Factorization Techniques for Recommender Systems," Computer, IEEE Computer Society, pp. 42-49, August 2009.

However, computational techniques like matrix factorization suffer from significant drawbacks. For example, matrix factorization requires a large number of input parameters—namely, a feature vector for each user and each item—which necessitates a high amount of computational power in order to generate the recommendations in a computationally-effective (and cost-effective) way.

Other machine learning techniques like blind regression have similar deficiencies, such as the effectiveness of the Gaussian kernel used and the spasticity of the neighbor matrix used. One example of blind regression is described in Lee et al., "Blind Regression: Nonparametric Regression for Latent Variable Models via Collaborative Filtering," $30^{th}$ Conference on Neural Information Processing Systems (NIPS 2016), Barcelona, Spain. However, such techniques typically rely on a hand-picked Gaussian kernel that may not be optimized for the particular application. As shown in experiments, the performance of blind regression varies depending upon different datasets used. For a larger dataset, the overall performance of the blind regression technique is far from the benchmark (e.g., state-of-the-art matrix factorization algorithm). More specifically, the accuracy and response time of this algorithm depends on the density of the neighbor matrix for each case. For cases with a dense neighbor matrix, the computational processing time is longer and this could cause delay in recommendation service response. For cases with a sparse neighbor matrix, the algorithm tries to improve the accuracy via adjusting the overlapping threshold parameter ($\beta$). A higher $\beta$ increases the accuracy, but reduces the density of the neighbor matrix. This could lead to an empty neighbor matrix and the algorithm would then fail to give an output—leaving the system with no recommendation, and thus no content, to provide to the user.

SUMMARY

Therefore, what is needed are methods and systems for generating digital content recommendations to a plurality of users in a network environment that enables seamless, real-time recommendations of content that a user will predictably interact with, based upon a feature vector generated from a neighborhood matrix. The methods and systems described herein provide the advantage of leveraging machine learning models and techniques to generate recommendations in a data-efficient manner, versus traditional techniques such as matrix factorization—which generally requires a large number of input parameters and computational resources.

The invention, in one aspect, features a computer-implemented method of recommending digital content in a network environment. A server computing device determines a session context of a user associated with a remote mobile computing device, the session context including content interactions in which the user interacted with one or more digital content objects during the session and interaction rating data for the content interactions where the user provided a rating to the one or more digital content objects. The server computing device identifies prior content interactions in which prior users interacted with one or more digital content objects via a mobile device and prior interaction rating data for the prior content interactions where prior users provided ratings to the digital content objects. The server computing device builds a recommendation feature vector from the session context of the user, the prior content interactions, and the prior interaction rating data, comprising: identifying one or more digital content objects with which (i) the user has interacted during the session and (ii) the user has provided a rating during the session and assigning the identified digital content objects to a first set of objects; identifying one or more prior users that have provided ratings for the digital content objects in the first set of objects; identifying one or more target digital content objects with which the user has not previously interacted and for which one or more prior users have provided ratings, and adding the identified target digital content objects to the first set of objects; determining, for each of the digital content objects in the first set of objects, an estimation of similarity using (i) the rating provided by the identified prior users for the digital content object, (ii) the rating provided by the user during the session for the digital content object, and (iii) the rating provided by prior users for the target digital content objects; compiling the estimations of similarity into a neighborhood matrix; and generating the recommendation feature vector using the neighborhood matrix, the recommendation feature vector comprising (i) a number of ratings provided by the user for other digital content objects; (ii) a number of ratings provided by prior users for the target digital content objects; (iii) an estimated probability distribution of ratings provided by the user for other digital content objects; (iv) an estimated probability distribution of ratings provided by prior users for the target digital content objects; (v) an estimated probability distribution of ratings provided by prior users for digital content objects in the first set of objects; and (vi) a weighted sum of a random sample of (v). The server computing device trains a machine learning model using the generated recommendation feature vector to minimize a cost function for a predicted rating of the user for the target digital content objects. The server computing device selects, using the trained machine learning model, one or more target digital content objects that have a predicted rating of the user that is at or above a predetermined threshold. The server computing device provides indicia of the selected target digital content objects to the remote mobile computing device of the user as a recommendation. The server computing device causes, based upon a message received from the remote mobile computing device in response to the indicia, at least one of the selected target digital content objects in the recommendation to be transmitted from a content server to the remote mobile computing device during the session.

The invention, in another aspect, features a system for recommending digital content in a network environment. The system includes a server computing device that determines a session context of a user associated with a remote mobile computing device, the session context including content interactions in which the user interacted with one or more digital content objects during the session and interaction rating data for the content interactions where the user provided a rating to the one or more digital content objects. The server computing device identifies prior content interactions in which prior users interacted with one or more digital content objects via a mobile device and prior interaction rating data for the prior content interactions where prior users provided ratings to the digital content objects. The server computing device builds a recommendation feature vector from the session context of the user, the prior content interactions, and the prior interaction rating data, comprising: identifying one or more digital content objects with which (i) the user has interacted during the session and (ii) the user has provided a rating during the session and assigning the identified digital content objects to a first set of objects; identifying one or more prior users that have provided ratings for the digital content objects in the first set of objects; identifying one or more target digital content objects with which the user has not previously interacted and for which one or more prior users have provided ratings, and adding the identified target digital content objects to the first set of objects; determining, for each of the digital content objects in the first set of objects, an estimation of similarity using (i) the rating provided by the identified prior users for the digital content object, (ii) the rating provided by the user during the session for the digital content object, and (iii) the rating provided by prior users for the target digital content objects; compiling the estimations of similarity into a neighborhood matrix; and generating the recommendation feature vector using the neighborhood matrix, the recommendation feature vector comprising (i) a number of ratings provided by the user for other digital content objects; (ii) a number of ratings provided by prior users for the target digital content objects; (iii) an estimated probability distribution of ratings provided by the user for other digital content objects; (iv) an estimated probability distribution of ratings provided by prior users for the target digital content objects; (v) an estimated probability distribution of ratings provided by prior users for digital content objects in the first set of objects; and (vi) a weighted sum of a random sample of (v). The server computing device trains a machine learning model using the generated recommendation feature vector to minimize a cost function for a predicted rating of the user for the target digital content objects. The server computing device selects, using the trained machine learning model, one or more target digital content objects that have a predicted rating of the user that is at or above a predetermined threshold. The server computing device provides indicia of the selected target digital content objects to the remote mobile computing device of the user as a recommendation. The server computing device causes, based upon a message received from the remote mobile computing device in response to the indicia, at least one of the selected target digital content objects in the recommendation to be transmitted from a content server to the remote mobile computing device during the session.

Any of the above aspects can include one or more of the following features. In some embodiments, the content interactions comprise viewing of digital content objects, downloading of digital content objects, streaming of digital content objects, or clicking on digital content objects. In some embodiments, the digital content objects comprise digital video files or digital audio files. In some embodiments, the interaction rating data comprise numeric values corresponding to a preference for the associated digital content objects.

In some embodiments, determining an estimation of similarity comprises: $\hat{y}_{v,j} = y(u,j) + y(v,i) - y(v,j)$, where $y(u,j)$ is the rating provided by the user during the session for the digital content object, $y(v,i)$ is the rating provided by a prior user for the target digital content object, and $y(v,j)$ is the rating provided by the prior user for the digital content object. In some embodiments, the weighted sum of a random sample of the estimated probability distribution of ratings provided by prior users for digital content objects in the first set of objects comprises:

$$\frac{\sum_{(v,j) \in N(u,i)} w_{v,j} \hat{y}_{v,j}}{\sum_{(v,j) \in N(u,i)} w_{v,j}},$$

where weight $w_{v,j} = \exp(-\lambda \min(S_{u,v}, S_{i,j}))$, $\Delta$ is a tuning parameter, and $S_{u,v}, S_{i,j}$ are estimations of user or item similarity.

In some embodiments, the machine learning model is trained using at least one of a logistic regression technique, a Random Forest technique, or a deep neural network technique. In some embodiments, the cost function is a Root Mean Square Error (RMSE).

In some embodiments, when generating the recommendation feature vector using the neighborhood matrix, the server computing device samples data to generate (iii), (iv), and (v), to preserve computing resources. In some embodiments, the content server transmits the digital content object to the remote mobile computing device as streamed content.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 7 is a flow diagram of a method of selecting target digital content objects using the trained machine learning model.

DETAILED DESCRIPTION

Figure 1:
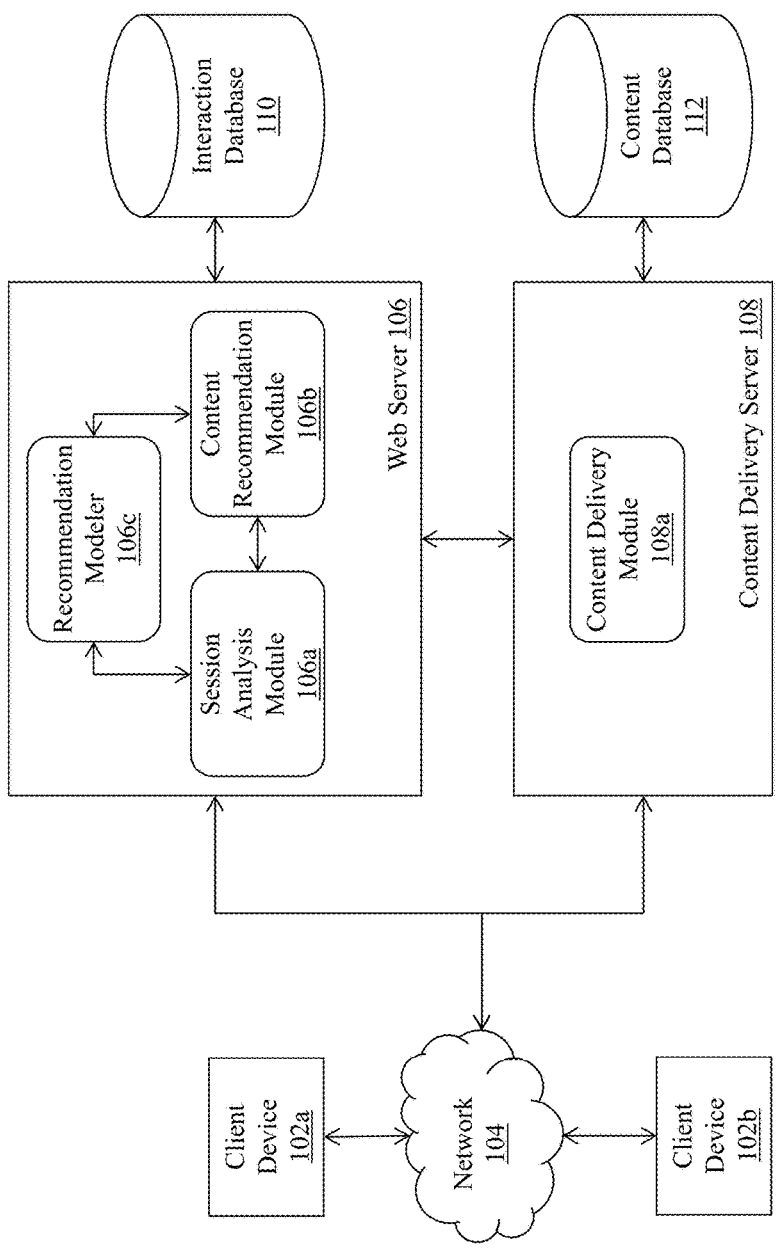
FIG. 1 is a block diagram of a system for recommending digital content objects in a network environment.

FIG. 1 is a block diagram of a system 100 for recommending digital content objects in a network environment. The system 100 includes a plurality of client computing devices 102a-102b that are coupled via communications network 104 to a web server 106 and a content delivery server 108. The web server 106 includes a session analysis module 106a, a content recommendation module 106b, and a recommendation modeler 106c, and the web server 106 is coupled to the content delivery server 108 and an interaction database 110. The content delivery server 108 includes a content delivery module 108a and the server 108 is coupled to a content database 112.

Exemplary client computing devices 102a-102b include, but are not limited to, tablets, smartphones, smart watches, laptops, and other mobile computing devices. It should be appreciated that other types of computing devices that are capable of connecting to the components of the system 100 can be used without departing from the scope of invention. Although FIG. 1 depicts two mobile computing devices 102a-102b, it should be appreciated that the system 100 can include any number of mobile devices.

The mobile devices 102a-102b can execute software applications, such as native applications and browser applications. In some embodiments, a native application is a software application (also called an 'app') that is installed locally on the mobile device 102 and written with programmatic code designed to interact with an operating system that is native to the mobile device 102. Such software is available from, e.g., the Apple® App Store or the Google® Play Store. In some embodiments, a browser application comprises software executing on a processor of the mobile device 102a-102b that enables the mobile device to communicate via HTTP or HTTPS with remote servers addressable with URLs (e.g., web server 106) to receive website-related content, including one or more webpages, for rendering in the browser application and presentation on a display device embedded in or coupled to the mobile device. Exemplary mobile browser application software includes, but is not limited to, Firefox™ Chrome™, Safari™, and other similar software. The one or more webpages can comprise visual and audio content for display to and interaction with a user.

The system 100 also includes a web server 106 (e.g., a computing device or devices) that hosts a website, to which the mobile devices 102a-102b can connect to retrieve and display webpage content. The web server 106 is a combination of hardware, including one or more special-purpose processors and one or more physical memory modules, and specialized software modules 106a, 106b, and 106c that are executed by a processor of the web server 106. In some embodiments, the website is an online content platform that provides certain digital content objects (e.g., video content such as movies, TV shows, etc. or audio content such as songs, audiobooks, podcasts, etc.) via a content delivery network. Typically, the website comprises a plurality of visual and non-visual elements that make up the content transmitted and displayed to a user when, e.g., browser software on the mobile device 102a-102b connects to the web server 106 via a communications network 104 (e.g., Internet) and requests content from the website. The elements of a website include, but are not limited to, webpages (e.g., HTML documents), image files, layouts, color sets, stylesheets, document object models (DOM), tracking elements, metadata, URLs, and content (e.g., text, audio, video).

A user at mobile device 102a-102b may establish a communication session with the web server 106 via the network 104 for the purpose of browsing digital content offerings made available by the web server 106 and interacting with certain digital content selected by the user, that is then delivered to the user's mobile device 102a-102b. As noted above, an important facet of providing digital content objects to users is determining what types of content a user may prefer and recommending that content to the user during a communication session. This leads to greater, more frequent interactivity between the user and the content platform.

To that end, the web server 106 includes a session analysis module 106a, a content recommendation module 106b, and a recommendation modeler 106c. The modules 106a, 106b, and 106c are specialized sets of computer software instructions that can be programmed onto a dedicated processor in the web server 106 and can include specifically-designated memory locations and/or registers for executing the specialized computer software instructions. As will be described in greater detail below, the session analysis module 106a monitors the communication session between a user's mobile device (e.g., device 102a) and the web server 106 to identify and track the user's interactivity with certain digital content objects offered by the web server 106. For example, the session analysis module 106a can record which digital content objects the user at mobile device 102a interacts with (e.g., which content objects the user clicks on, views, listens to, streams, downloads, etc.) and how long the interaction lasts (e.g., how long the user views the user streams the content), as well as any ratings that the user may assign to certain digital content objects, during the communication session. In this context, a rating is the numeric value (or in some cases, alphanumeric value) that corresponds to the user's preference for the associated digital content object. It can be appreciated that the rating can be part of a scale (e.g., 0 to 5 stars, with 5 stars being the top rating and 0 stars being the bottom). The session analysis module 106a can capture these ratings as the user assigns them during the session. As many users communicate with the web server 106, the web server builds a database of user interactions and associated ratings that is used to determine subsequent content recommendations for the user during the same session, or for other users during future sessions, as will be described below.

The content recommendation module 106b receives the content interaction data, including the ratings, from the session analysis module 106a in order to generate content recommendations for the user during the session. The content recommendation module 106b leverages the recommendation modeler 106c to generate the recommendations using a feature vector and neighborhood matrix technique that is described in greater detail below.

The content delivery server 108 is a combination of hardware, including one or more special-purpose processors and one or more physical memory modules, and a specialized software module 108a that are executed by a processor of the content delivery server 108. In some embodiments, the content delivery server 108 is part of a content delivery network (CDN) that manages and transmits digital content objects to requesting devices, such as mobile devices 102a-102b. The content delivery module 108a is a specialized set of computer software instructions that can be programmed onto a dedicated processor in the content delivery server 108 and can include specifically-designated memory locations and/or registers for executing the specialized computer software instructions. As will be described in greater detail below, the content delivery module 108a can communicate with the content recommendation module 106b of the web server 106 to receive content recommendation data and/or content selection data from the web server 106 and initiate transmission of digital content objects to, e.g., the mobile devices 102a-102b.

The system 100 also includes an interaction database 110 and a content database 112. The interaction database 110 is a computing device (or in some embodiments, a set of computing devices) coupled to the web server 106 and is configured to receive, generate, and store specific segments of data relating to the process of recommending digital content objects in a network environment as described herein. For example, the interaction database 110 can store data elements relating to the session monitoring process performed by the session analysis module 106a as described herein (e.g., user content interaction data, user rating data, and the like). In some embodiments, the interaction database 110 can store data elements relating to the recommendation generation and modeling processes as described herein. In some embodiments, all or a portion of the interaction database 110 can be integrated with the web server 106 or be located on a separate computing device or devices. The interaction database 110 can comprise one or more databases configured to store portions of data used by the other components of the system 100, as will be described in greater detail below. An exemplary interaction database 110 is MySQL™ available from Oracle Corp. of Redwood City, Calif.

The content database 112 is a computing device (or in some embodiments, a set of computing devices) coupled to the content delivery server 108 and is configured to store digital content objects and, in conjunction with the content delivery server 108, deliver the digital content objects to the mobile devices 102a-102b upon request from either the mobile device or the web server 106 as described herein. In some embodiments, the content database 112 can comprise a plurality of computing devices in a content delivery network (CDN) that stores all or a portion of the digital content objects offered by the content platform of the web server 106. In some embodiments, all or a portion of the content database 112 can be integrated with the content delivery server 108 or be located on a separate computing device or devices. The content database 112 can comprise one or more databases configured to store portions of data used by the other components of the system 100, as will be described in greater detail below. An exemplary content database 112 is Oracle 12c™ or MySQL™.

Figure 2:
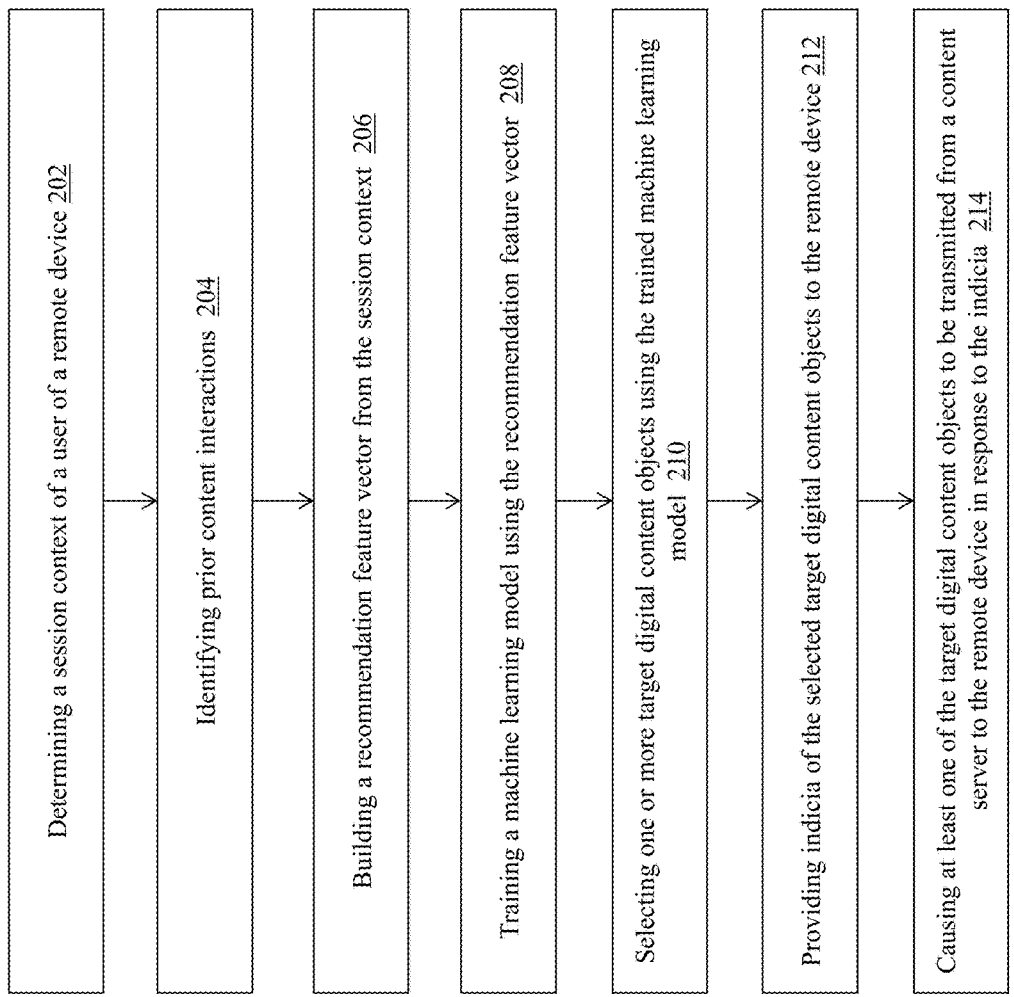
FIG. 2 is a flow diagram of a computerized method of recommending digital content objects in a network environment.

FIG. 2 is a flow diagram of a computerized method 200 of recommending digital content objects in a network environment, using the system 100 of FIG. 1. A user at mobile device 102a establishes a communication session with the web server 106 to browse, select, and receive digital content objects via web server 106. As the user is interacting with certain digital content objects during the session, the session analysis module 106a determines (202) a session context of the user of mobile device 102a. The session context comprises a plurality of data elements recorded by the session analysis module 106a via any of a variety of different data capture techniques—such as URL monitoring (i.e., saving and analyzing the syntax/content of particular webpage URLs that the user navigates to), tracking cookies embedded in webpages, screen scraping, session packet interdiction, database logging, session credential analysis, and the like. The recorded data elements typically comprise content interaction data relating to the digital content objects with which the user is interacting during the session, and interaction rating data associated with the content interactions where the user provided a rating to one or more of the digital content objects with which the user interacted. For example, if during the session a user begins streaming a particular video and, after watching a portion of the video (or all of the video), gives the video a rating, the session analysis module 106a can record data elements such as the title of the video, the filename of the video, metadata of the video (e.g., content type, genre, length), the duration at which the user ended the video, and other information (e.g., time of day that the user watched the video, etc.). The session analysis module 106a can store this information, along with the user's assigned rating for the video, in the interaction database 110.

During the session, the content recommendation module 106b receives the content interactions and associated ratings for the current user from the session analysis module 106a and/or the interaction database 110, for use in generating content recommendations for the user. The content recommendation module 106b also identifies (204) prior content interactions in which prior users of the system 100 (that is, users other than the current user) interacted with one or more digital content objects and, in some cases, assigned a rating to the digital content object as part of the interaction—for use in generating recommendations for the current user. For example, a plurality of other prior users can communicate with the web server 106 to browse, view, download, and otherwise interact with digital content objects provided by the web server 106. During these sessions, the session analysis module 106a can capture session context information in the same way as described above with respect to the current user. The session analysis module 106a can store this captured information in, e.g., interaction database 110.

In some embodiments, the content recommendation module 106b identifies the prior content interactions based upon a similarity between the current user and one or more of the prior users (e.g., demographic information, content preferences, content interaction history, and the like). In some embodiments, the content recommendation module 106b identifies the prior content interactions based upon a similarity between the digital content objects interacted with during the current user's session and the digital content objects interacted with by the prior users during their sessions (e.g., title, subject matter, genre, etc.).

Then, during the current user's session, the content recommendation module 106b builds (206) a recommendation feature vector from the session context of the current user (as captured by the session analysis module 106a), the prior content interactions identified by the module 106b, and the prior interaction rating data associated with the prior interactions. A key feature of the inventive systems and methods described herein is the generation of a recommendation feature vector without reliance on computing techniques employed by traditional recommender engines, such as matrix factorization and/or blind regression, as referenced above. Essentially, the content recommendation module 106b transforms the user input (in the form of content interactions and ratings from the current user and prior users) into a feature vector, which is a summary of statistics of the neighborhood matrix of the user-content object pairs.

Figure 3:
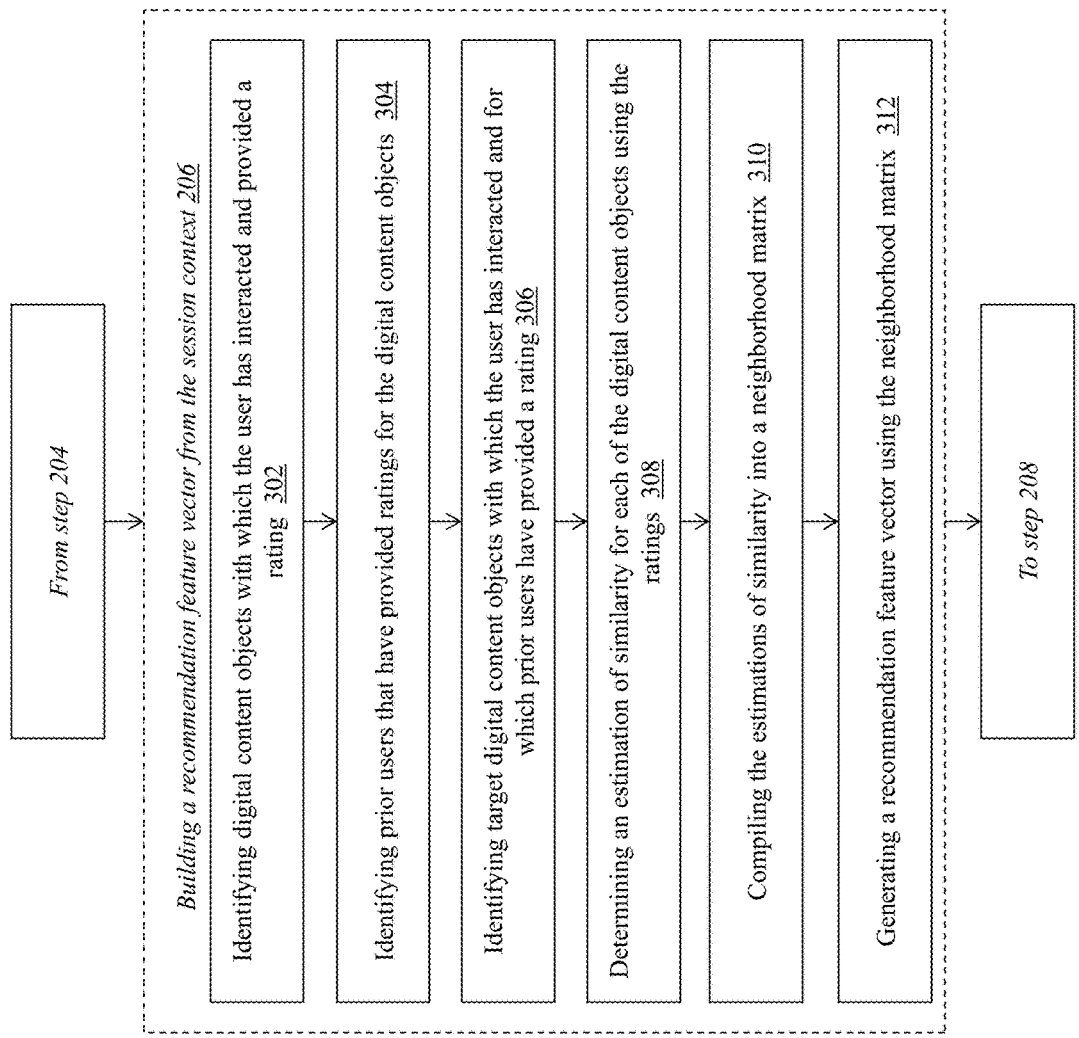
FIG. 3 is a flow diagram of a computerized method for building a recommendation feature vector.

FIG. 3 is a flow diagram of a computerized method for building the recommendation feature vector. First, the content recommendation module 106b identifies (302) digital content objects with which the current user at mobile device 102a has interacted during the session and for which the current user has provided a rating during the session. For example, the current user at mobile device 102a may have interacted with Content Object A and provided a rating of 5 stars, and the user may have interacted with Content Object B and provided a rating of 2 stars. The content recommendation module 106b captures the content interaction data and the ratings as described above, and assigns the digital content objects into a first set (or grouping) of objects.

The content recommendation module 106b identifies (304) one or more prior users that have provided a rating for the digital content objects in the first set of objects. For example, the module 106b determines that User X and User Y each previously interacted with one or more of the digital content objects in the first set of objects, and provided a rating based upon their interactions. The module 106b captures the prior content interaction data, including the ratings provided by the prior users.

Next, the content recommendation module 106b identifies (306) one or more target digital content objects with which the current user at mobile device 102a has not previously interacted and with which one or more prior users have interacted and provided ratings. In this example, a target digital content object is a content object that may be (or may not be) recommended to the current user at mobile device 102a, depending on the system's 100 determination of a probability of the current user responding to the digital content object (i.e., how likely is it that the current user will interact with the digital content object if recommended). Because the content recommendation module 106b determines that prior users have interacted with and provided ratings for the target digital content objects, the module 106b adds these digital content objects to the first set of objects. At this point, the first set of objects includes (i) the content objects with which the current user has interacted and provided a rating during the session and (ii) target content objects with which prior users have interacted and provided ratings, but with which the current user has not interacted.

For each of the digital content objects in the first set of objects, the content recommendation module 106b determines (308) an estimation of similarity using (i) the rating provided by the identified prior users for the digital content object, (ii) the rating provided by the current user at mobile device 102a during the session for the digital content object, and (iii) the rating provided by the prior users for the target digital content objects.

Figure 4:
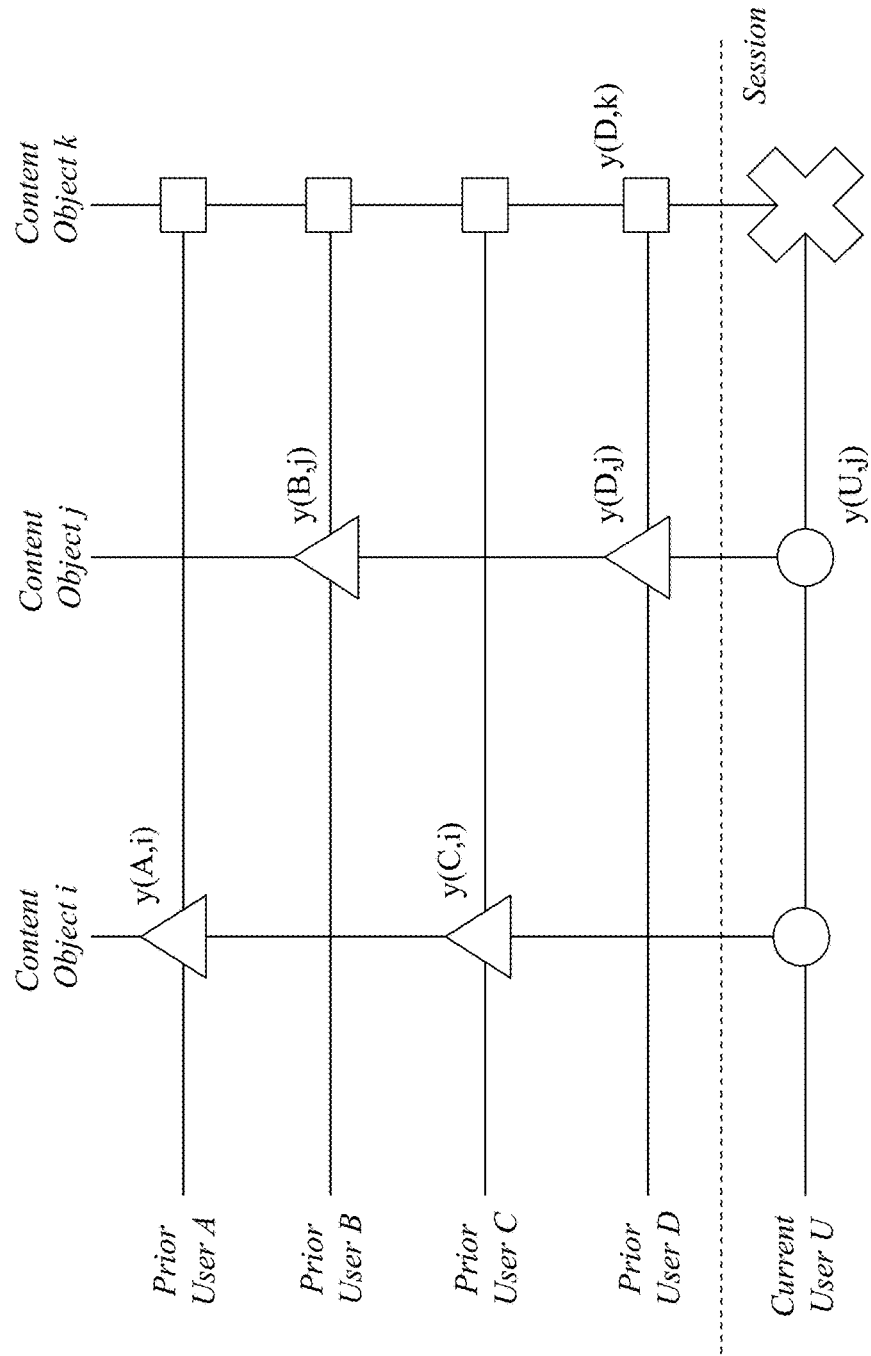
FIG. 4 is an exemplary diagram of a neighborhood matrix generated by the content recommendation module.

A detailed explanation of how the content recommendation module 106b determines the estimation of similarity is set forth below. FIG. 4 is a diagram of a neighborhood matrix 400 generated by the content recommendation module 106b that incorporates the estimations of similarity. As shown in FIG. 4, the content recommendation module 106b has captured interaction data, including ratings, for four prior users (Prior Users A, B, C, and D) and for the Current User, for each of three digital content objects (Content Objects i, j, and k). The circles represent the ratings that the Current User has provided for the particular content objects—in this case, the Current User has interacted with, and provided a rating for, Content Object i and Content Object j. The squares represent the ratings that the Prior Users have provided for Content Object k (which, in this case, is the target content object). The triangles represent the ratings that one or more of the Prior Users have provided for one or more of the digital content objects (e.g., Content Object i and Content Object j) that the Current User has interacted with during the session (denoted by the dotted line). The X represents the predicted rating that the Current User would provide for the target Content Object k—which is what the content recommendation module 106b seeks to solve. Because the Current User has not interacted with, and not provided a rating for, target Content Object k, the module 106b aims to predict this value in order to determine whether the module 106b should recommend the Content Object k to the Current User.

The content recommendation module 106b calculates an estimation of similarity value (ŷ) for each triangle in the neighborhood matrix—that is, how similar are the ratings provided by the Current User and the prior users for the same content objects, which can then be leveraged by the system 100 to determine a predicted rating for the target content object by the Current User. As shown in FIG. 4, the estimation of similarity value for each triangle can be calculated by analyzing the Current User's rating for a content object, a prior user's rating for the same content object, and that prior user's rating for the target content object.

For example, to determine the estimation of similarity for the triangle denoted by y(D,j), the module 106b can use the following equation:

$$\hat{y}_{D,j} = y(U,j) + y(D,k) - y(D,j)$$

where y(U,j) is the Current User's rating for Object j, y(D,k) is Prior User D's rating for target Object k, and y(D,j) is Prior User D's rating for Object j. The content recommendation module 106b calculates the estimation of similarity for each triangle in the neighborhood matrix and compiles (310) the estimations of similarity into the neighborhood matrix.

Next, the module 106b generates (312) the recommendation feature vector using the neighborhood matrix. To generate the feature vector, the content recommendation module 106b constructs the following summary statistics:

a) Distribution of estimation of related ratings that share either a user or a content object with the target user-object pair (as shown in FIG. 4, the target user-object pair is U,k).

b) Distribution of ratings from the same user (e.g., Current User U) for other content objects (e.g., Objects i, j).

c) Distribution of ratings from prior users (e.g., Prior Users A, B, C, D) for the target content object (e.g., Object k).

d) Estimated probability distribution of ratings from the same user (e.g., Current User U) for other content objects; alternatively, estimated probability distribution of ratings from prior users for the target content object.

e) Average of user similarity per estimation;

f) Average of item similarity per estimation;

g) Estimated probability distribution of $\hat{y}_{D,j}$.

h) Weighted sum of all of a random sample of $\hat{y}_{D,j}$:

$$\frac{\sum_{(D,j) \in N(U,k)} w_{D,j} \hat{y}_{D,j}}{\sum_{(D,j) \in N(U,k)} w_{D,j}}$$

where the weight w is defined as:

$$w_{D,j} = \exp(-\lambda \min(S_{U,D}, S_{k,j}))$$

λ is a parameter to be tuned and $S_{U,D}, S_{k,j}$ are estimations of user or item similarity from observed values (cosine similarity or pair-wise similarity).

Figure 5A:
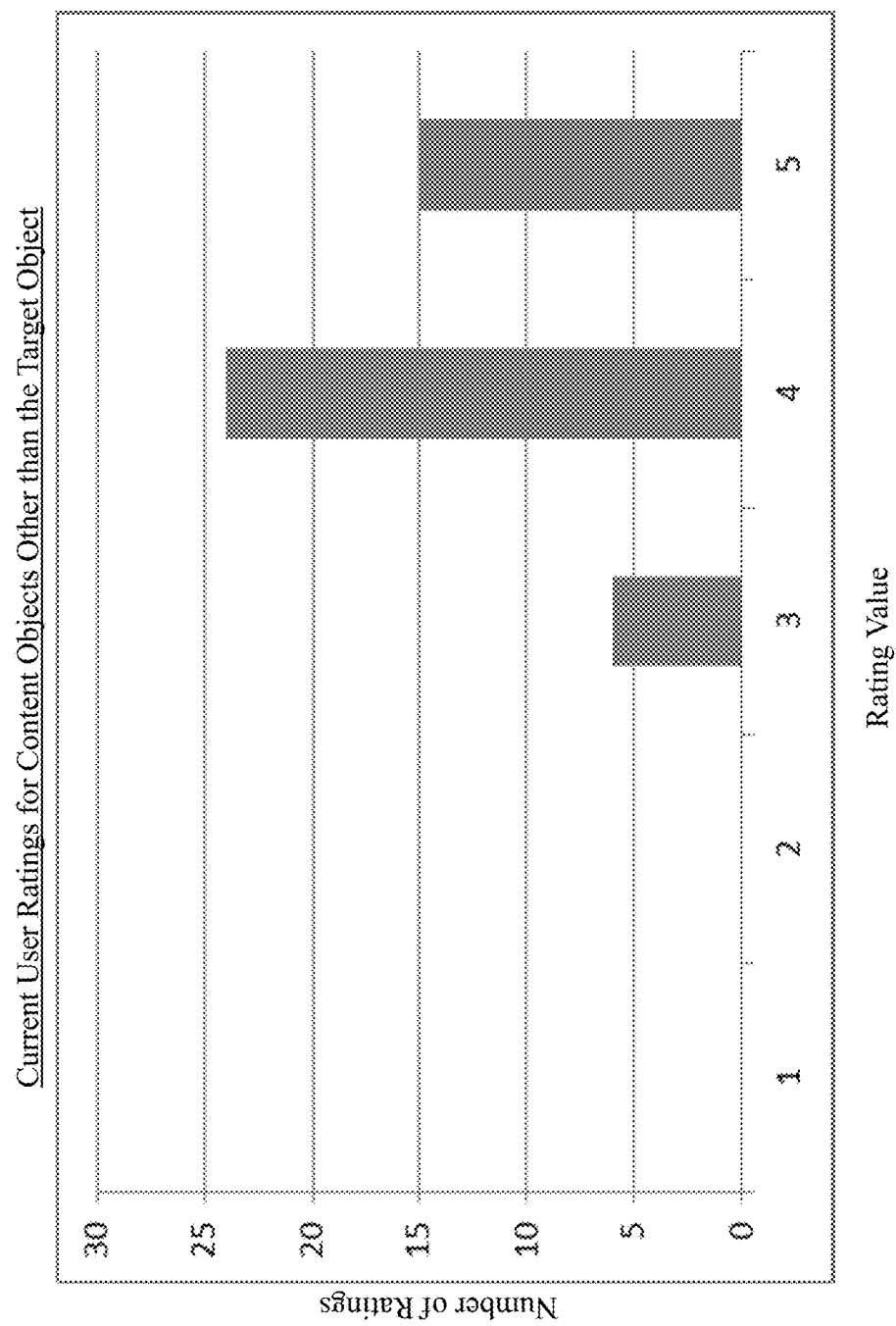
FIG. 5A is an exemplary representation of summary statistics for distribution of ratings from a current user for other content objects.
Figure 5B:
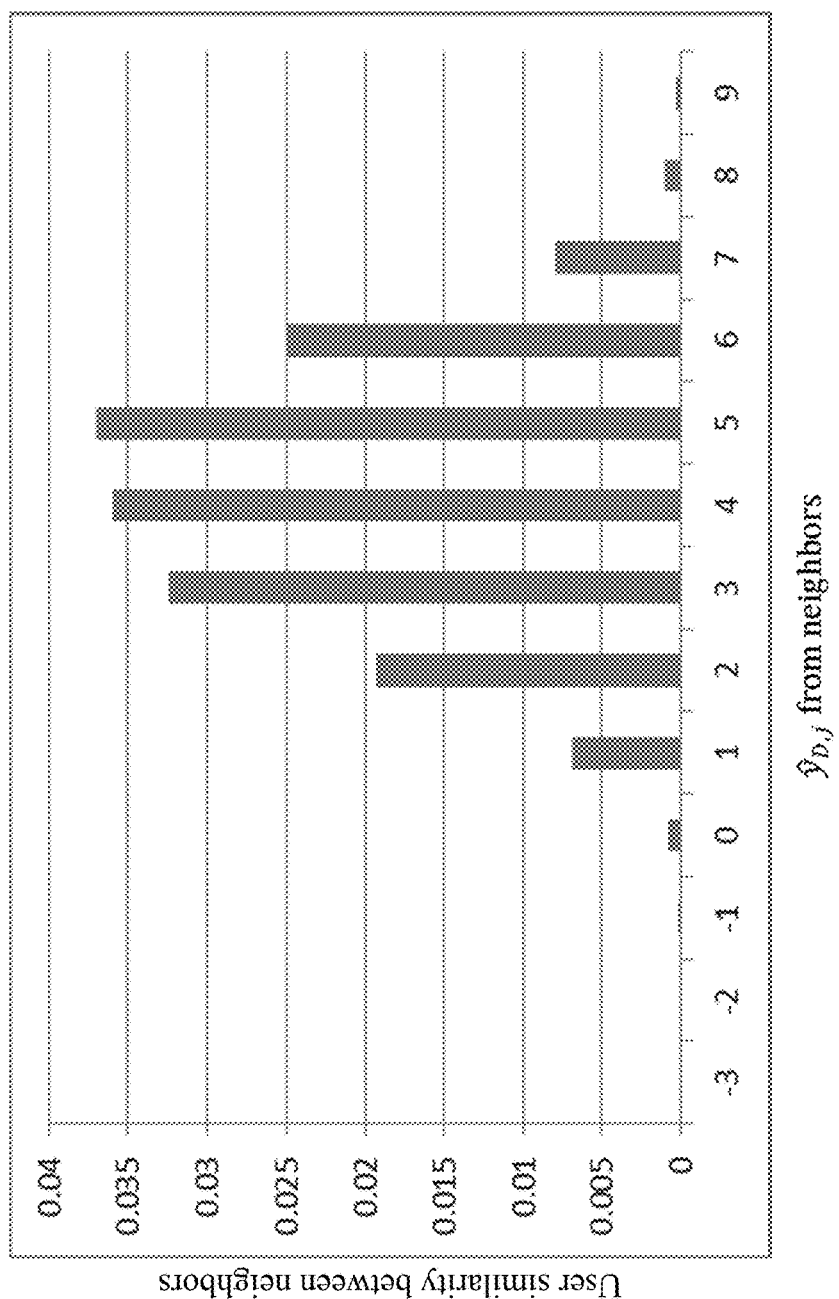
FIG. 5B is an exemplary representation of summary statistics for average of user similarity per estimation.

An exemplary representation of summary statistics for category (b) above is shown in FIG. 5A, and an exemplary representation of summary statistics for category (e) above is shown in FIG. 5B. For example, as shown in FIG. 5A, the Current User has provided 45 ratings for other digital content objects other than the target object. Most of the ratings are either 4 or 5. The content recommendation module 106b can factor this distribution of ratings into the feature vector (e.g., as a baseline or bias for ratings for the particular user). As shown in FIG. 5B, the neighbors in the matrix that calculate an estimation of 4 or 5 are similar to the Current User-Target Object pair from a user perspective. The x-axis is $\hat{y}_{D,j}$ from neighbors and the y-axis is the user similarity between the neighbors which give a specific prediction and target user item pair. The content recommendation module 106b generates at least some of the summary statistics noted above and stacks them together in the recommendation feature vector.

Once the recommendation feature vector has been generated, the content recommendation module 106b leverages the recommendation modeler 106c to generate a recommendation by training (208) a machine learning model using the recommendation feature vector. The recommendation modeler 106c is a machine learning software module that is trained using the recommendation feature vector to minimize a cost function (e.g., Root Mean Square Error (RMSE)) between a predicted rating value and known rating value. In some embodiments, the recommendation modeler 106c is trained using one or more of the following machine learning techniques: logistic regression, random forest, or deep neural network. The recommendation modeler 106c uses the created feature vectors for each known rating, along with the known ratings, to determine a best machine learning model and corresponding parameters (i.e., which model results in the lowest RMSE). The recommendation modeler 106c can then save the model and its parameters to, e.g., database 110 for use in subsequent recommendation estimation and ranking functions.

Figure 6:
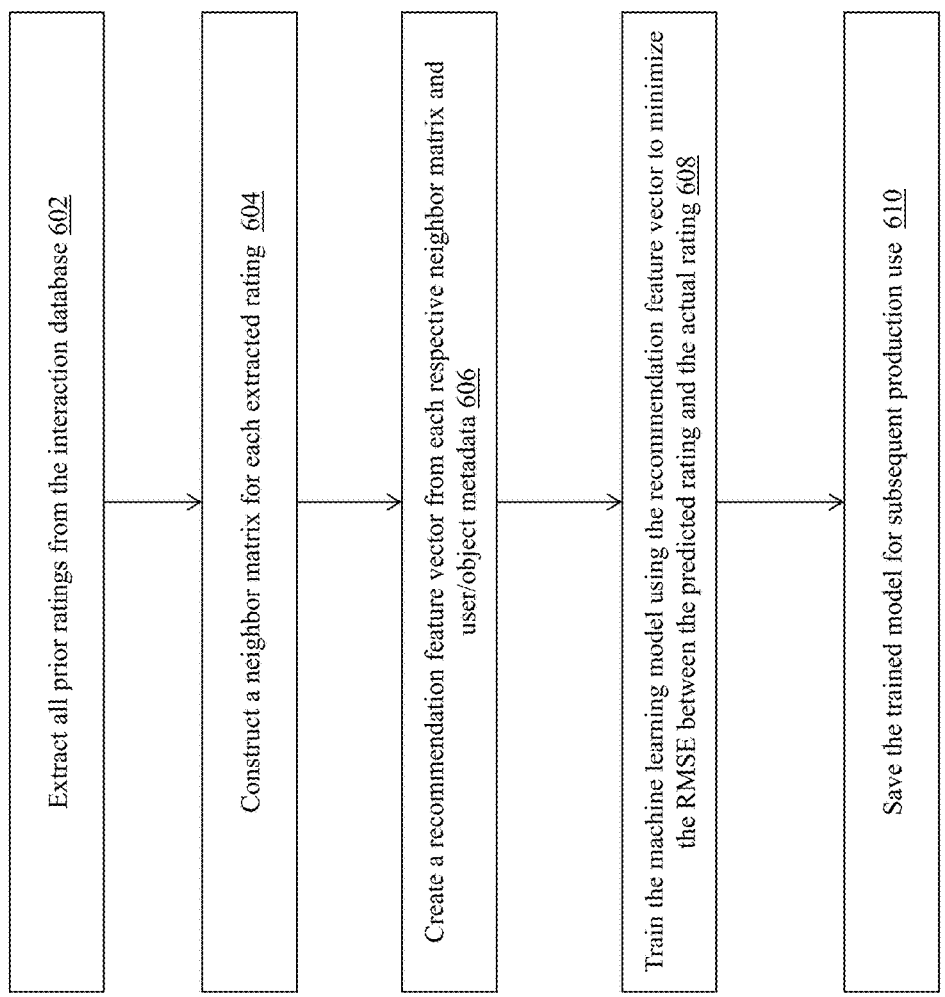
FIG. 6 is a flow diagram of a method of generating the machine learning model.

An exemplary workflow for generating the machine learning model is shown in FIG. 6. The content recommendation module 106b extracts (602) all prior ratings (for the current user and for prior users) from the interaction database 110. For each extracted rating, the module 106b constructs (604) a neighbor matrix as described above. The module 106b creates (606) a recommendation feature vector from each respective neighbor matrix and from metadata of the user and the content object for each rating (e.g., user ID, content object ID, name, device ID, and the like). The recommendation modeler 106c trains (608) a model using the recommendation feature vector as input to minimize the RMSE between the predicted rating and the actual rating. Then, the modeler 106c saves (610) the trained model for subsequent production use.

After training the model, the content recommendation module 106b selects (210) one or more target digital content objects using the trained machine learning model stored in the database 110. The content recommendation module 106b provides as input to the model one or more digital content objects with which the current user has not previously interacted and/or for which the current user has not provided a rating. The module 106b executes the model using the recommendation modeler 106c to estimate ratings for these digital content objects, and selects one or a plurality of these objects that have, in one example, the highest estimated ratings as the set of digital content objects that will be recommended to the current user during the session.

FIG. 7 is a flow diagram of a method of selecting target digital content objects using the trained machine learning model. The web server 106 establishes (702) a communication session with the remote device 102a of the user. For example, the user may log into a webpage provided by the web server 106 using authentication credentials (e.g., username, password). The content recommendation module 106b construct (704) a neighbor matrix for each digital content object that the user has not rated before. Then, the module 106b creates (706) a recommendation feature vector for each neighbor matrix and from metadata of the user and the content object for each rating. The content recommendation module 106b uses (708) the trained machine learning model described above to predict a rating for each feature vector. The module 106b then ranks (710) the digital content objects based upon the predicted rating, and selects a predetermined number of content objects that have, e.g., the highest rating and uses the ranked objects in a list as output to the remote device 102a.

The content recommendation module 106b retrieves metadata about the selected digital content objects (e.g., title, description, filenames, related images, etc.) from the content database 112 and generates a graphical user interface (GUI) corresponding to the recommended target digital content objects for display on the mobile device 102a of the current user.

The content recommendation module 106b provides (212) indicia of the selected target digital content objects to the remote device 102a. For example, the module 106b can provide the GUI that includes a list of the recommended target digital content objects for display to the user, and each item in the list can include a link to interact with the corresponding digital content object. In one example, the link can point to a storage area in the content database 112 that is managed by the content delivery server 108. The user at remote device 102b can select one of the recommended digital content objects, and transmit a message indicating the user's selection back to the content recommendation module 106b. In some embodiments, the user can select more than one of the recommended digital content objects for interaction.

The content recommendation module 106b then causes (214) the target digital content object(s) selected by the user to be transmitted from the content delivery server 108 to the remove device 102a. For example, the module 106b can communicate with the content delivery module 108a to establish a communication session (e.g., an HTTP redirect) between the content delivery server 108 and the remote device 102a. The content delivery module 108a can then begin transmission of the selected target digital content object (e.g., streaming, downloading, etc.) to the remote device 102a, which displays or provides the digital content object to the user for interaction.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed-computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computer-implemented method of recommending digital content in a network environment, the method comprising:
   determining, by a server computing device, a session context of a user associated with a remote mobile computing device, the session context including content interactions in which the user interacted with one or more digital content objects during the session and interaction rating data for the content interactions where the user provided a rating to the one or more digital content objects;
   identifying, by the server computing device, prior content interactions in which prior users interacted with one or more digital content objects via a mobile device and prior interaction rating data for the prior content interactions where prior users provided ratings to the digital content objects;
   building, by the server computing device, a recommendation feature vector from the session context of the user, the prior content interactions, and the prior interaction rating data, comprising:
      identifying one or more digital content objects with which (i) the user has interacted during the session and (ii) the user has provided a rating during the session and assigning the identified digital content objects to a first set of objects;
      identifying one or more prior users that have provided ratings for the digital content objects in the first set of objects;
      identifying one or more target digital content objects with which the user has not previously interacted and for which one or more prior users have provided ratings, and adding the identified target digital content objects to the first set of objects;
      determining, for each of the digital content objects in the first set of objects, an estimation of similarity using (i) the rating provided by the identified prior users for the digital content object, (ii) the rating provided by the user during the session for the digital content object, and (iii) the rating provided by prior users for the target digital content objects;
      compiling the estimations of similarity for each of the digital content objects in the first set of objects into a neighborhood matrix;
      generating the recommendation feature vector using the neighborhood matrix, the recommendation feature vector comprising (i) a number of ratings provided by the user for other digital content objects; (ii) a number of ratings provided by prior users for the target digital content objects; (iii) an estimated probability distribution of ratings provided by the user for other digital content objects; (iv) an estimated probability distribution of ratings provided by prior users for the target digital content objects; (v) an estimated probability distribution of ratings provided by prior users for digital content objects in the first set of objects; and (vi) a weighted sum of a random sample of (v);
   training, by the server computing device, a machine learning model using the generated recommendation feature vector to minimize a cost function for a predicted rating of the user for the target digital content objects;
   selecting, by the server computing device using the trained machine learning model, one or more target digital content objects that have a predicted rating of the user that is at or above a predetermined threshold;
   providing, by the server computing device, indicia of the selected target digital content objects to the remote mobile computing device of the user as a recommendation; and
   causing, by the server computing device based upon a message received from the remote mobile computing device in response to the indicia, at least one of the selected target digital content objects in the recommendation to be transmitted from a content server to the remote mobile computing device during the session.

2. The computer-implemented method of claim 1, wherein the content interactions comprise viewing of digital content objects, downloading of digital content objects, streaming of digital content objects, or clicking on digital content objects.

3. The computer-implemented method of claim 2, wherein the digital content objects comprise digital video files or digital audio files.

4. The computer-implemented method of claim 1, wherein the interaction rating data comprise numeric values corresponding to a preference for the associated digital content objects.

5. The computer-implemented method of claim 1, wherein determining an estimation of similarity comprises:

$$\hat{y}_{v,j} = y(u,j) + y(v,i) - y(v,j)$$

where $y(u,j)$ is the rating provided by the user during the session for the digital content object, $y(v,i)$ is the rating provided by a prior user for the target digital content object, and $y(v,j)$ is the rating provided by the prior user for the digital content object.

6. The computer-implemented method of claim 1, wherein the weighted sum of a random sample of the estimated probability distribution of ratings provided by prior users for digital content objects in the first set of objects comprises:

$$\frac{\sum_{(v,j) \in N(u,i)} w_{v,j} \hat{y}_{v,j}}{\sum_{(v,j) \in N(u,i)} w_{v,j}},$$

where weight $w_{v,j} = \exp(-\lambda \min(S_{u,v}, S_{i,j}))$, $\lambda$ is a tuning parameter, and $S_{u,v}, S_{i,j}$ are estimations of user or item similarity.

7. The computer-implemented method of claim 1, wherein the machine learning model is trained using at least one of a logistic regression technique, a Random Forest technique, or a deep neural network technique.

8. The computer-implemented method of claim 7, wherein the cost function is a Root Mean Square Error (RMSE).

9. The computer-implemented method of claim 1, wherein when generating the recommendation feature vector using the neighborhood matrix, the server computing device samples data to generate (iii), (iv), and (v), to preserve computing resources.

10. The computer-implemented method of claim 1, wherein the content server transmits the digital content object to the remote mobile computing device as streamed content.

11. A system for recommending digital content objects in a network environment, the system comprising:
a server computing device; and
a non-transitory computer readable storage device communicatively coupled to the server computing device, wherein the server computing device executes instructions stored on the non-transitory computer readable storage device to perform operations comprising:
determining a session context of a user associated with a remote mobile computing device, the session context including content interactions in which the user interacted with one or more digital content objects during the session and interaction rating data for the content interactions where the user provided a rating to the one or more digital content objects;
identifying prior content interactions in which prior users interacted with one or more digital content objects via a mobile device and prior interaction rating data for the prior content interactions where prior users provided ratings to the digital content objects;
building a recommendation feature vector from the session content of the user, the prior content interactions, and the prior interaction rating data, comprising:
identifying one or more digital content objects with which (i) the user has interacted during the session and (ii) the user has provided a rating during the session and assigning the identified digital content objects to a first set of objects;
identifying one or more prior users that have provided ratings for the digital content objects in the first set of objects;
identifying one or more target digital content objects with which the user has not previously interacted and for which one or more prior users have provided ratings, and adding the identified target digital content objects to the first set of objects;
determining, for each of the digital content objects in the first set of objects, an estimation of similarity using (i) the rating provided by the identified prior users for the digital content object, (ii) the rating provided by the user during the session for the digital content object, and (iii) the rating provided by prior users for the target digital content objects;
compiling the estimations of similarity for each of the digital content objects in the first set of objects into a neighborhood matrix;
generating the recommendation feature vector using the neighborhood matrix, the recommendation feature vector comprising (i) a number of ratings provided by the user for other digital content objects; (ii) a number of ratings provided by prior users for the target digital content objects; (iii) an estimated probability distribution of ratings provided by the user for other digital content objects; (iv) an estimated probability distribution of ratings provided by prior users for the target digital content objects; (v) an estimated probability distribution of ratings provided by prior users for digital content objects in the first set of objects; and (vi) a weighted sum of a random sample of (v);
training a machine learning model using the generated recommendation feature vector to minimize a cost function for a predicted rating of the user for the target digital content objects;
selecting, using the trained machine learning model, one or more target digital content objects that have a predicted rating of the user that is at or above a predetermined threshold;
providing indicia of the selected target digital content objects to the remote mobile computing device of the user as a recommendation; and
causing, based upon a message received from the remote mobile computing device in response to the indicia, at least one of the selected target digital content objects in the recommendation to be transmitted from a content server to the remote mobile computing device during the session.

12. The system of claim 11, wherein the content interactions comprise viewing of digital content objects, downloading of digital content objects, streaming of digital content objects, or clicking on digital content objects.

13. The system of claim 12, wherein the digital content objects comprise digital video files or digital audio files.

14. The system of claim 11, wherein the interaction rating data comprise numeric values corresponding to a preference for the associated digital content objects.

15. The system of claim 11, wherein determining an estimation of similarity comprises:

$$\hat{y}_{v,j} = y(u,j) + y(v,i) - y(v,j)$$

where $y(u,j)$ is the rating provided by the user during the session for the digital content object, $y(v,i)$ is the rating provided by a prior user for the target digital content object, and $y(v,j)$ is the rating provided by the prior user for the digital content object.

16. The system of claim 11, wherein the weighted sum of a random sample of the estimated probability distribution of ratings provided by prior users for digital content objects in the first set of objects comprises:

$$\frac{\sum_{(v,j) \in N(u,i)} w_{v,j} \hat{y}_{v,j}}{\sum_{(v,j) \in N(u,i)} w_{v,j}},$$

where weight $w_{v,j} = \exp(-\lambda \min(S_{u,v}, S_{i,j}))$, $\lambda$ is a tuning parameter, and $S_{u,v}, S_{i,j}$ are estimations of user or item similarity.

17. The system of claim 11, wherein the machine learning model is trained using at least one of a logistic regression technique, a Random Forest technique, or a deep neural network technique.

18. The system of claim 17, wherein the cost function is a Root Mean Square Error (RMSE).

19. The system of claim 11, wherein when generating the recommendation feature vector using the neighborhood matrix, the server computing device samples data to generate (iii), (iv), and (v), to preserve computing resources.

20. The system of claim 11, wherein the content server transmits the digital content object to the remote mobile computing device as streamed content.

* * * * *